(12) United States Patent
McGean

(10) Patent No.: US 8,608,356 B1
(45) Date of Patent: Dec. 17, 2013

(54) UNDERBODY TERRAIN LIGHTING FOR OFF-ROAD VEHICLES

(76) Inventor: James W. McGean, Huntington Beach, CA (US)

( * ) Notice: Subject to any disclaimer, the term of this patent is extended or adjusted under 35 U.S.C. 154(b) by 227 days.

(21) Appl. No.: 13/317,880

(22) Filed: Oct. 31, 2011

(51) Int. Cl.
*B60Q 1/02* (2006.01)
*B60Q 1/24* (2006.01)

(52) U.S. Cl.
USPC .......................................... 362/500; 362/549

(58) Field of Classification Search
USPC .................. 362/27.4, 42, 459, 487–507, 549
See application file for complete search history.

(56) References Cited

U.S. PATENT DOCUMENTS

| | | | |
|---|---|---|---|
| 2,786,935 A | 6/1955 | Geary | |
| 4,442,477 A * | 4/1984 | Hennessey | 362/52 |
| 5,209,559 A | 5/1993 | Ruppel | |
| 5,430,625 A | 7/1995 | Abarr | |
| 5,473,518 A | 12/1995 | Haber et al. | |
| 5,572,251 A | 11/1996 | Ogawa | |
| 6,250,784 B1 | 6/2001 | Kayama | |
| 6,386,731 B1 | 5/2002 | Cheng | |
| 6,392,559 B1 | 5/2002 | Sharpe, Jr. | |
| 6,582,108 B1 | 6/2003 | Liang | |
| 6,612,726 B1 * | 9/2003 | Gloodt et al. | 362/500 |
| 6,789,928 B2 | 9/2004 | Khan | |
| 7,131,756 B2 | 11/2006 | Leslie | |
| 7,195,385 B2 | 3/2007 | Zimmermann | |
| 7,611,267 B2 | 11/2009 | Cooper | |
| 7,641,369 B1 | 1/2010 | Deveau | |
| 2004/0264207 A1 | 12/2004 | Jones | |
| 2005/0030755 A1 | 2/2005 | Thomas | |
| 2005/0099820 A1 | 5/2005 | Cooper | |
| 2007/0002574 A1 | 1/2007 | Huang | |

* cited by examiner

*Primary Examiner* — Karabi Guharay
*Assistant Examiner* — Nathaniel Lee
(74) *Attorney, Agent, or Firm* — Dennis W. Beech

(57) ABSTRACT

The present invention may be used for illuminating the terrain in the proximity of the axles, differential, wheels and tires for off-road vehicles. An access cover of differential gear axle housing may have lateral ribs formed as part of the cover outside surface. A recess may be formed by recess walls as an element of the lateral ribs. A light emitting device may be mounted in the recess and may be electrically connected through a port in the recess walls to an electrical power source controllable from an off-road vehicle.

12 Claims, 4 Drawing Sheets

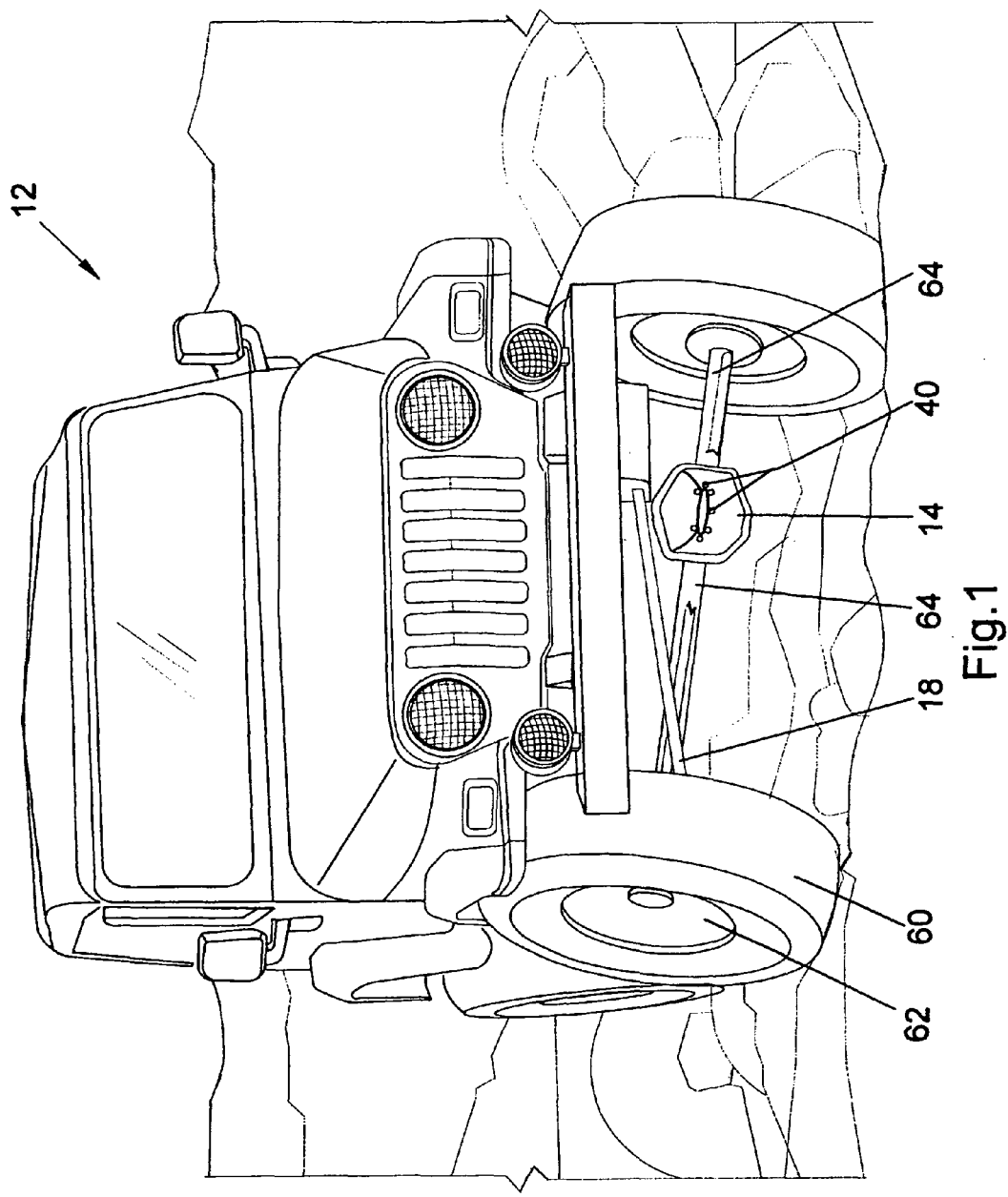

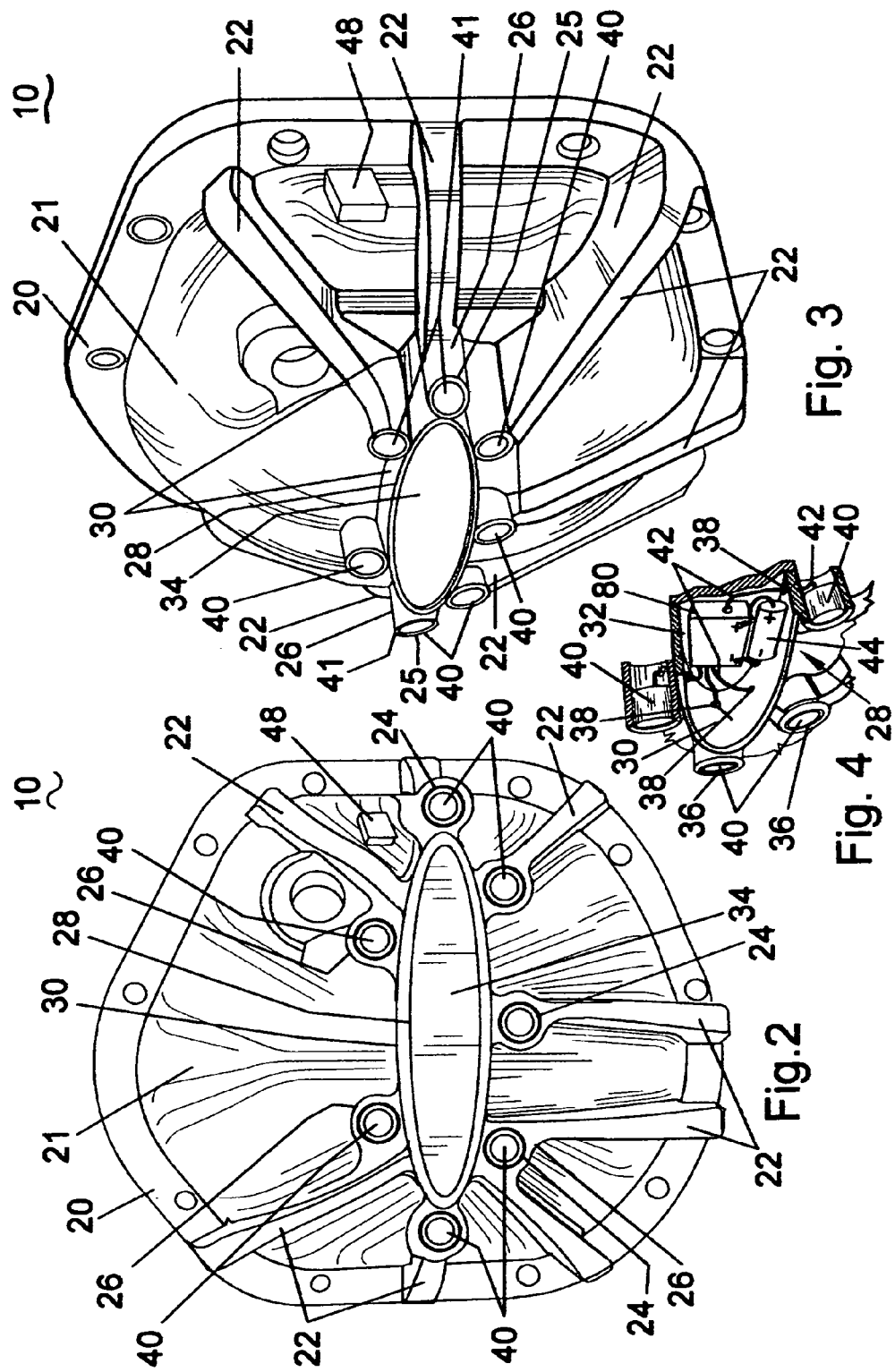

UNDERBODY TERRAIN LIGHTING FOR OFF-ROAD VEHICLES

BACKGROUND OF THE INVENTION

This invention relates to lighting systems for off-road land vehicles for illuminating the terrain in proximity of the axles and wheels of the vehicles for night viewing of terrain obstacles. The new lighting system is incorporated into the differential housing for drive wheels of the off-road vehicles.

Head lamps or lights, fog lights, and back-up lights may be incorporated on or in the body/chassis of land vehicles, including off-road vehicles such as heavy duty pickup trucks, trucks and equipment, and sport utility vehicles (SUVs). These off-road vehicles often have extra ground clearance, sturdy tires, and front and rear locking differentials with housings. Off-road vehicles may often include four wheel drive vehicles. One example of use of off-road vehicles is for Rock Crawling for which vehicles are typically modified with larger than stock tires, suspension components that allow greater axle articulation and terrain separation distance and changes in the differential gear ratio in order to provide the ideal high torque/low speed operation for traversing obstacles. A rock crawler vehicle may have a spotter or an assistant who will go on foot along side of or in front of the vehicle to provide information to the driver on obstacles or areas of terrain that the driver may not be able to see.

For night operation or driving, whether for Rock Crawling or other rough terrain vehicle use, there is often a need for illumination in the proximity of the axles, differentials and wheels/tires for a driver or spotter to view obstacles in order for a vehicle to progress in an off-road environment. There is a need for mounting of lamps, light-emitting devices and the liked under land vehicles for night off-road operation.

SUMMARY OF THE INVENTION

The present invention is directed to systems for illuminating the terrain in the proximity of the axles, differential, wheels and tires for off-road vehicles. An access cover of differential gear axle housing may have lateral ribs formed as part of the cover outside surface. A recess may be formed by recess walls as an element of the lateral ribs. A light emitting device may be mounted in the recess and may be electrically connected through a port in the recess walls to an electrical power source controllable from an off-road vehicle.

These and other features, aspects and advantages of the present invention will become better understood with reference to the following drawings, description and claims.

BRIEF DESCRIPTION OF THE DRAWINGS

FIG. 1 illustrates a perspective view of an off-road vehicle with modified suspension components and added differential gear housing lighting according to an embodiment of the invention;

FIG. 2 illustrates an elevation view of an access cover of differential gear housing with lighting system components according to an embodiment of the invention;

FIG. 3 illustrates a perspective elevation view of an access cover of differential gear housing with lighting system components according to an embodiment of the invention;

FIG. 4 illustrates a perspective fragmentary sectional view of an access cover of a differential gear housing with lighting, batteries and wiring according to an embodiment of the invention;

DETAILED DESCRIPTION

Figure 5:
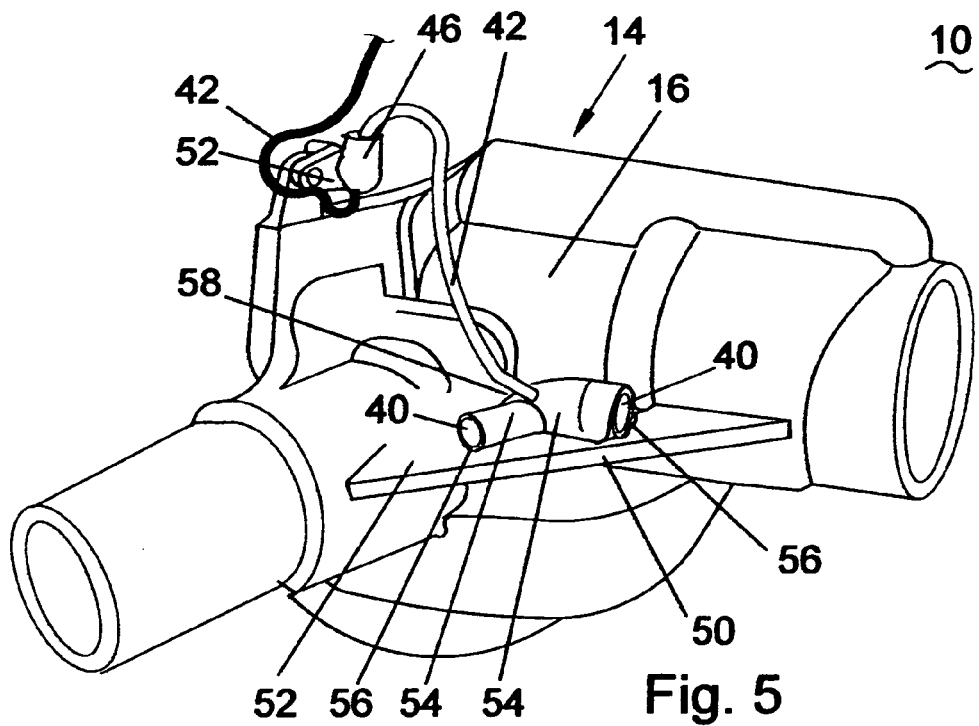
FIG. 5 illustrates a perspective elevation view of a pinion shaft and differential gear axle housing with lighting system components according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 4, a lighting system 10 for the underbody of an off-road vehicle 12 may have components mounted in an access cover 20 of a differential gear axle housing 14. The access cover 20 may have recesses 24 formed in portions of the structure at an outside surface 21 that also are lateral ribs 22 that are used to reinforce the access cover 20. Depending on the type of illumination or light emitting device 40 used, the recesses 24 may generally be cylindrical or other suitable form. The recesses 24 illustrated in FIGS. 2 and 3 are internally cylindrical with recess walls 26 formed to mate with the lateral ribs 22 adjacent an elongated generally centrally positioned receptacle 28 or compartment with side wall 30 and bottom 32 contoured to the curvature of the access cover 20. The receptacle 28 has a cover 34 fastened to enclose the electrical wiring 42 and batteries 44 for powering the light emitting devices 40. The cover 34 may be used as a name plate.

The recesses 24 with light emitting devices 40 may be sealed at outer edge 36 to inhibit entry of liquids, such as water, and debris from causing damage or failure of the lighting system 10 components. The exterior walls 26 may have ports 38 open to the receptacle 28 for electrical connections between the light emitting devices 40 and the power source 44. The application and removal of electrical power may be controlled remotely by a switch or control system (not shown) positioned in a console or dash board for ease of control by a driver of the off-road vehicle 12. The power control may be by wiring connection or a wireless remote control device (not shown) to a controller 80 positioned in the receptacle 28. The connecting wiring (partially shown) between the lighting system 10 components in the access cover 20 may be routed and attached to structural elements of the off-road vehicle 12 similar to that understood for land vehicle wiring for other electronic components. The power source 44 is illustrated as a battery; however, the light emitting devices 40 may also be connected by cables 42 to a connector 48 that is then connected to the vehicle 12 electrical system (not shown).

Figure 6:
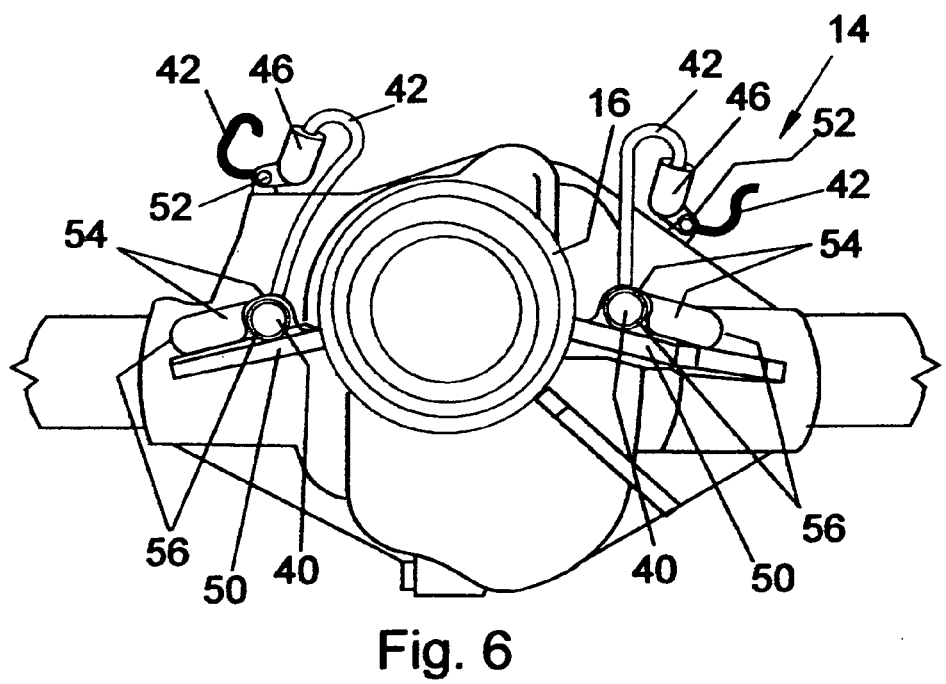
FIG. 6 illustrates an elevation view of a pinion shaft and differential gear axle housing with lighting system components according to an embodiment of the invention.

Referring to FIGS. 5 and 6, the pinion shaft and differential gear axle housing 14 may have light emitting sources 40 with electrical wiring 42 attached to lateral ribs 50 adjacent to the pinion shaft housing 16 component. An attachment bracket 52 may be used to retain a connector 46 or other power source. The same wiring and control system as used to control the lighting system 10 components on the access cover 20 may be used to operate the components illustrated in FIGS. 5 and 6. The light emitting devices 40 may be mounted in generally cylindrical housings 54 that are open at one end 56 and closed at the opposite end 58. The lighting housings 54 may be oriented to direct light generally parallel to the pinion shaft housing 16 axis or at an angular orientation to the housing 16. Two lighting housings 54 are illustrated in FIG. 5 oriented at approximately right angles to one another.

Referring to FIGS. 1 through 6, the light emitting devices 40 generally appear to be directed to the rear or the front of a vehicle 12 depending on whether the differential housing 14 is part of a rear axle (not shown) or a front axle 64 and the illumination will be generally parallel to a pinion shaft axis (not shown). However, light emitting devices 40 may be produced in a variety of light emitting beam forms. For example, the light beam may spread outwardly from the source in a broad cone shape or may be a narrower beam that is directed at an angle relative to the axis of the recess 24 or housing 54. In the case of the access cover 20 recesses 24 the recess walls 26 may have slanted ends 25 relative to an imaginary plane parallel to the access cover 20 flange to allow orientation of light emitting devices 41 to direct light beams to areas of interest at the front or rear portion of the vehicle 12. Also in the case of the housing 54, they may be rotated relative to the longitudinal axis to direct a light beam other than parallel to the pinion shaft housing axis.

With desired orientation of the light emitting devices 40 an off-road vehicle 12 driver may be able to negotiate rough terrain at night in order to travel. In extremely rough terrain a spotter may use the lighting system 10 at night to aid a driver in traveling in the vehicle. The lighting system 10 may be incorporated in recreational and military vehicles. Special light emitting devices 40 may be incorporated, for example, infra-red, for use in military applications to avoid enemy detection and to aid the driver/user. An example of military use may be light emitting devices requiring night vision capability to be seen that assist vehicles in a convoy to follow closely at night and yet avoid detection by an enemy.

Figure 8:
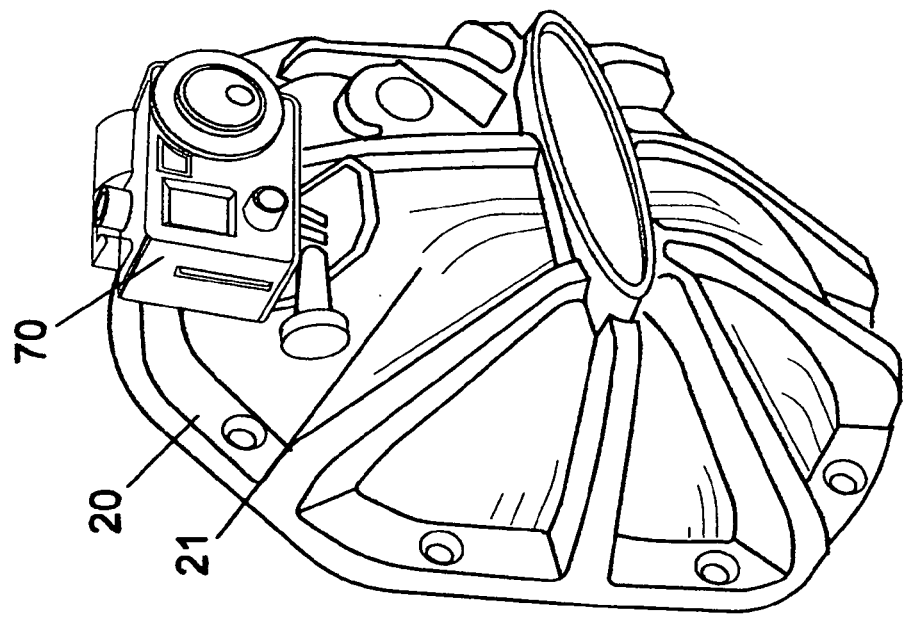
FIG. 8 illustrates a perspective elevation view of an access cover of differential gear axle housing with a camera according to an embodiment of the invention.
Figure 7:
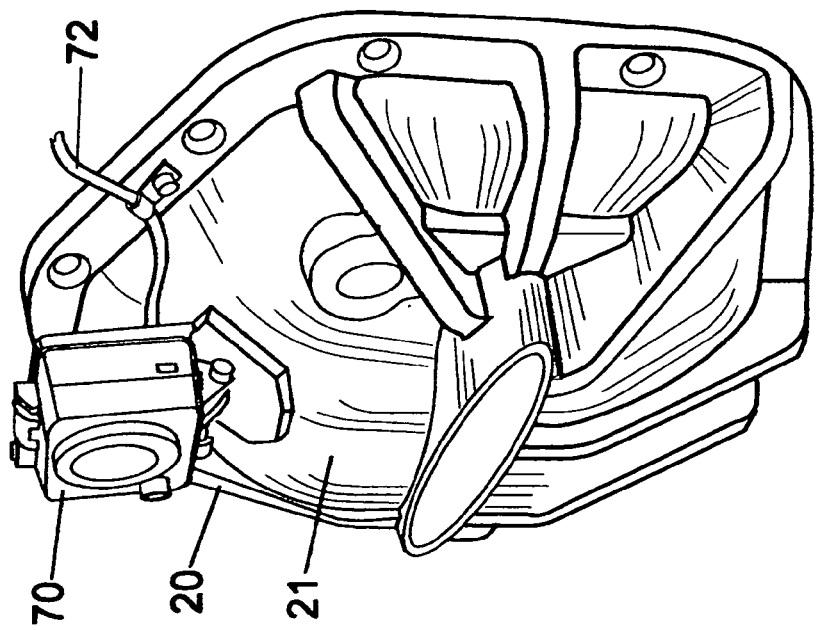
FIG. 7 illustrates a perspective elevation view of an access cover of differential gear axle housing with a camera according to an embodiment of the invention.

Referring to FIGS. 7 and 8, a camera 70 may be mounted on the access cover 20 positioned to view the terrain adjacent to the differential housing 14. The camera 70 may be a digital camera with a digital cable 72 connected to a display (not shown) in the vehicle driver field of view to allow use without the driver having to exit the vehicle 12. The camera 70 may also have a memory device for storage of images and a wireless image transmitter to transmit images to a remote receiver.

While the invention has been particularly shown and described with respect to the illustrated embodiments thereof, it will be understood by those skilled in the art that the foregoing and other changes in form and details may be made therein without departing from the spirit and scope of the invention.

I claim:

1. A system for illuminating the terrain in the proximity of the axles, differentials and tires for off-road land vehicles comprising:
    a differential gear axle housing with an access cover that has a plurality of lateral ribs formed as part of an outside surface;
    a receptacle with a side wall and a removable cover attached to said access cover;
    a recess formed by a recess wall formed as an element of said lateral ribs wherein said recess wall has an aperture adjacent said receptacle and said recess is disposed approximately perpendicular to said access cover; and
    a light emitting device is mounted in said recess and is electrical connected to an electrical power source controllable from an off-road vehicle.

2. The system as in claim 1 wherein said receptacle is formed as part of said access cover with a bottom formed as a portion of said outside surface.

3. The system as in claim 1 wherein said recess walls are sealed at an outer edge and said light emitting source to protect against entry of debris, liquids and other material into said recess.

4. The system as in claim 1 wherein said electrical connection is a cable from said light emitting device routed through said aperture into said receptacle for connection to a battery.

5. The system as in claim 1 wherein said electrical connection is a cable from said light emitting device routed through said aperture into said receptacle for connection to a power source of said off-road vehicle.

6. The system as in claim 1 wherein application of said electrical power source is controlled by a wireless controller.

7. The system as in claim 1 wherein said recess wall has a slanted end relative to an imaginary plane parallel to said access cover flange.

8. The system as in claim 1 wherein said differential gear axle housing on said pinion shaft housing member has a shaft housing lateral rib with a lighting housing attached with an open end and a light emitting device is mounted in said lighting housing and is electrically connected to said electrical power source.

9. The system as in claim 8 wherein said electrical power source is a battery attached to an attachment bracket attached to said differential gear axle housing and said electrical connection is a cable.

10. The system as in claim 1 wherein a camera is mounted on said outside surface disposed approximately perpendicular to said access cover and has a cable attached connectable to a control system of an off-road vehicle.

11. The system as in claim 10 wherein said camera has a memory device and a wireless image transmitter.

12. A system for illuminating the terrain in the proximity of the axles, differentials and tires for off-road land vehicles comprising:
    a differential gear axle housing with a pinion shaft housing member with a shaft housing lateral rib;
    a lighting housing attached to said shaft housing lateral rib that is disposed with an open end to illuminate an area in the proximity of said differential gear axle housing and said pinion shaft housing member; and
    a light emitting device is mounted in said lighting housing and is electrically connected to an electrical power source controllable from an off-road vehicle.

* * * * *